(12) United States Patent
Johnson et al.

(10) Patent No.: US 12,150,414 B2
(45) Date of Patent: Nov. 26, 2024

(54) LAND VEHICLE WITH SWEEPER MACHINE ASPECT

(71) Applicants: Bob Johnson, Abilene, TX (US); Kelly Young, Abilene, TX (US)

(72) Inventors: Bob Johnson, Abilene, TX (US); Kelly Young, Abilene, TX (US)

( * ) Notice: Subject to any disclaimer, the term of this patent is extended or adjusted under 35 U.S.C. 154(b) by 398 days.

(21) Appl. No.: 17/571,701

(22) Filed: Jan. 10, 2022

(65) Prior Publication Data

US 2023/0217871 A1 Jul. 13, 2023

(51) Int. Cl.
*A01G 20/43* (2018.01)
*A01B 63/10* (2006.01)

(52) U.S. Cl.
CPC .............. *A01G 20/43* (2018.02); *A01B 63/10* (2013.01)

(58) Field of Classification Search
CPC ........ A01G 20/43; E01H 1/005; E01H 1/053; E01H 1/056
See application file for complete search history.

(56) References Cited

U.S. PATENT DOCUMENTS

| 1,674,306 | A | | 6/1928 | Shaw | |
|---|---|---|---|---|---|
| 4,557,010 | A | * | 12/1985 | Rosseau | E01H 1/056 15/83 |
| 6,675,424 | B2 | * | 1/2004 | Smith | E01H 1/0845 15/349 |
| 7,191,485 | B1 | * | 3/2007 | Ramer | E01H 1/0872 15/34 |
| 7,281,296 | B2 | * | 10/2007 | Strauser | E01H 1/0854 15/348 |
| 7,500,284 | B2 | * | 3/2009 | Zylstra | A01G 20/43 15/340.3 |
| 10,137,815 | B2 | * | 11/2018 | Zanini | E01H 1/056 |
| 2012/0047667 | A1 | | 3/2012 | Arsenault et al. | |
| 2015/0217802 | A1 | * | 8/2015 | Schaedler | B62D 7/08 180/6.34 |

FOREIGN PATENT DOCUMENTS

CN 209941572 U * 1/2020
CN 111101469 A * 5/2020

* cited by examiner

*Primary Examiner* — Marc Carlson
(74) *Attorney, Agent, or Firm* — Brian K. Yost; Decker Jones, PC

(57) ABSTRACT

A land vehicle comprises first and second wheel motors that control respective rates of rotation of left and right rear wheels. An accelerator adjustment assembly controls the first and second wheel motors and comprises first and second linkage assemblies that cause the rate of rotation of an inside rear wheel to slow during a turn exceeding a predetermined turning radius. In preferred embodiments, the land vehicle is a sweeper machine comprising a debris collection assembly, a hopper, and a hydraulic cylinder adapted to lift and lower the debris collection assembly. The debris collection assembly comprises a collection body, a brush adjustment assembly, and a rotary brush assembly. The brush adjustment assembly comprises a height adjustment lever and an actuator comprising a piston rod. The piston rod is adapted to raise and lower a first end of the height adjustment lever such that the rotary brush assembly is raised and lowered.

21 Claims, 8 Drawing Sheets

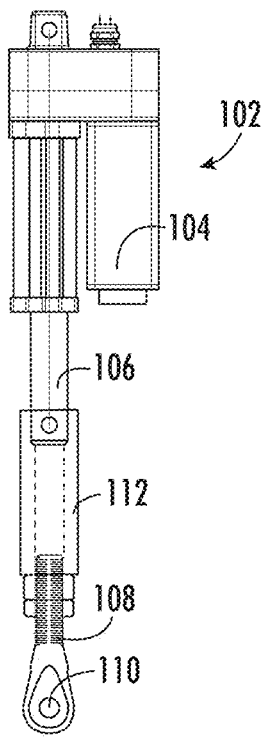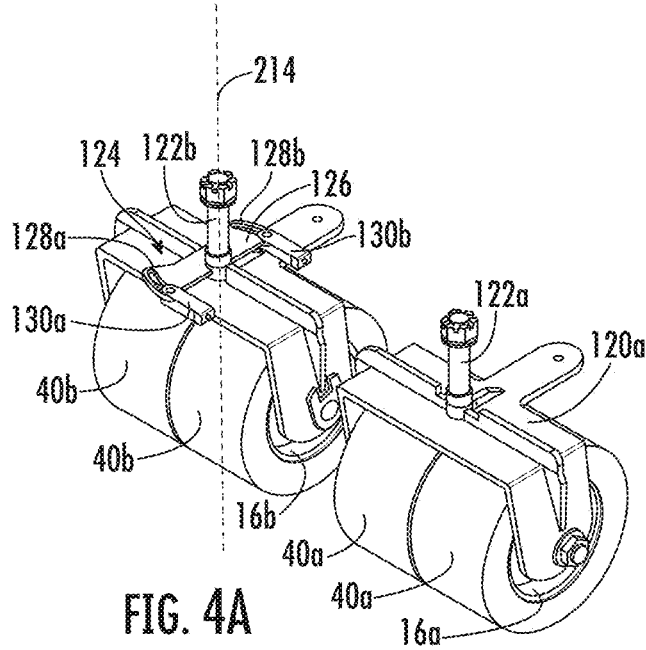
FIG. 3  FIG. 4A
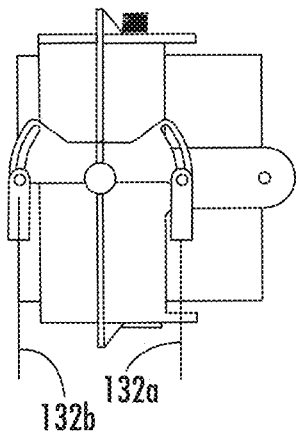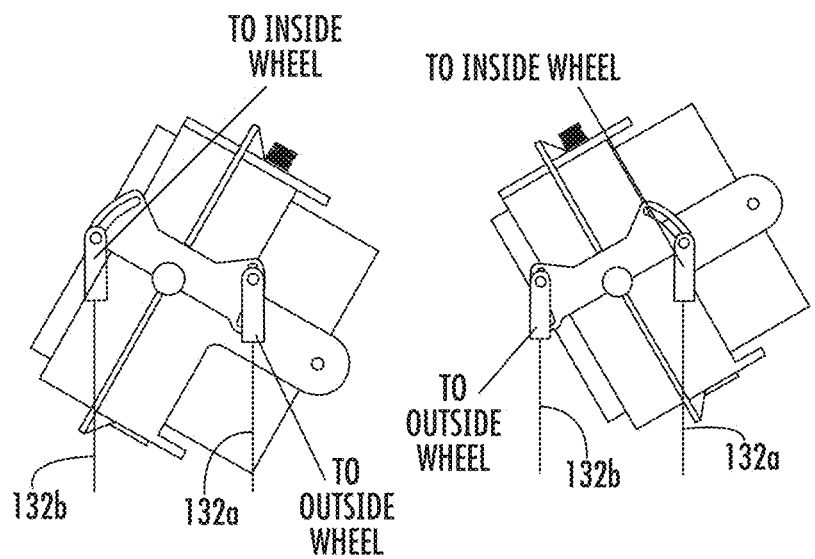
FIG. 4B  FIG. 4C  FIG. 4D

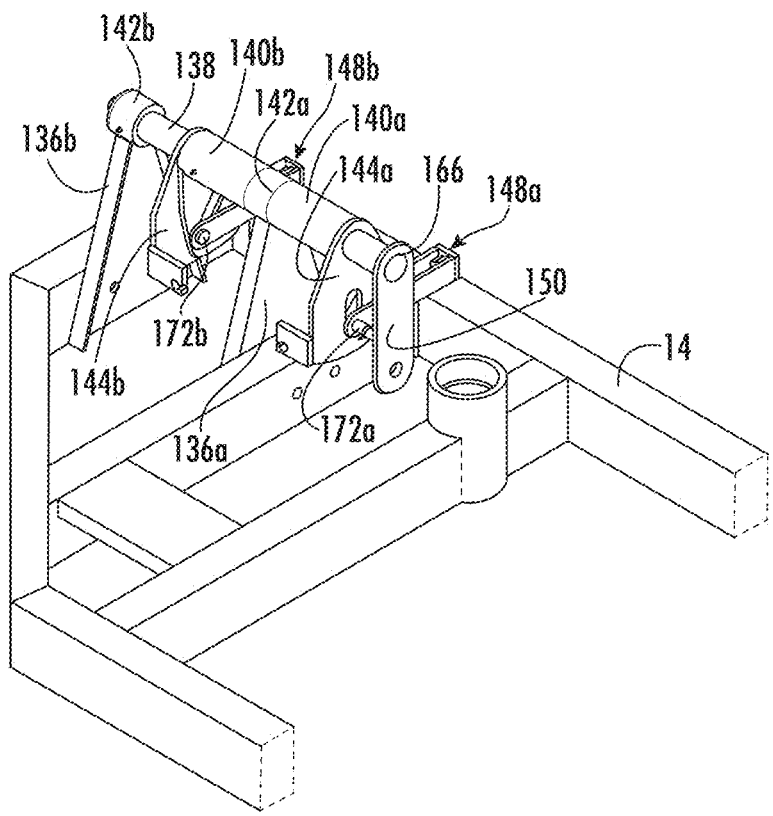
FIG. 7
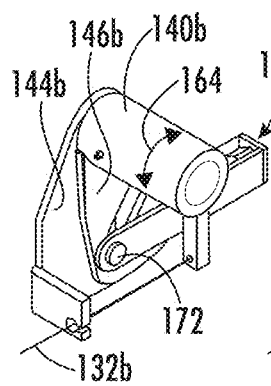 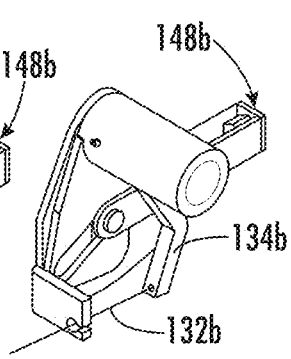 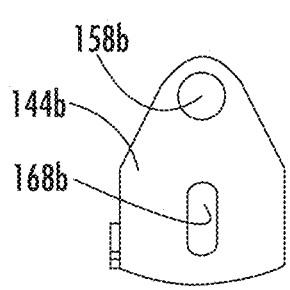 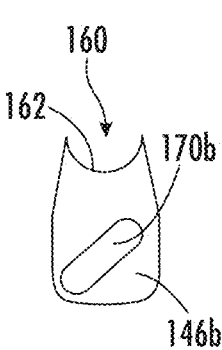
FIG. 8  FIG. 9  FIG. 10  FIG. 11

LAND VEHICLE WITH SWEEPER MACHINE ASPECT

BACKGROUND OF THE INVENTION

1. Field of the Invention

The present invention relates generally to land vehicles and specifically to a land vehicle comprising an accelerator adjustment assembly and a golf course sweeper adapted to remove plugs and other debris on a surface of a golf course.

2. Description of the Prior Art

Debris including litter, dust, sand, gravel are often found on roads, parking lots, and other surfaces. Removal of such debris from road surfaces is done in a number of ways including by use of sweeper vehicles. Typically, such vehicles are provided with a rotary brush for lifting the debris toward a container, where the debris is captured. For example, Arsenault, US Pat. No. Pub. No. US 2012/0047667, teaches a self-propelled mechanical street sweeper comprising a pickup broom for lifting debris to be off-loaded to an auxiliary vehicle such as a dump truck. Similarly, Glubrecht, US Pat. No. Pub. No. US 2020/0318301, provides a pavement sweeper with multiple sweeping modes for the removal of debris from a swept surface. Smith, U.S. Pat. No. 6,675,424 discloses a mobile litter pickup vehicle has a pair of forward corner brushes independently mounted on articulated arms. Strauser, U.S. Pat. No. 7,281,296 provides a street sweeper that includes a broom, a debris transport mechanism and a debris storage compartment.

As golf courses comprise various types of debris such as grass clippings, leaves, and aeration plugs, there are machines known in the art that are adapted for sweeping and collecting such debris. For example, Leis, US Pat. Pub. No. 2020/0245570 provides a turf sweeper for collecting debris, including core aeration plugs, and includes a hopper mounted on a frame. Ramer, U.S. Pat. No. 7,191,485 provides a towable vacuum sweeper that includes a blower for pulling debris in a stream of air through a vacuum duct into a hopper. Zylstra, U.S. Pat. No. 7,500,284 discloses a turf sweeping machine having a frame, a chute, rotatable brush, and a hopper. Brantley, U.S. Pat. No. Pub. No. US 2006/0085945, provides a towable sweeping apparatus having an impeller and a bin arranged to receive debris collected by the impeller. Ettrich, US Pat. No. Pub. No. US 2014/0075714, provides a sweeper apparatus for removing sand from areas of grass and includes rollers, a blower, and a collection container.

The prior art sweepers discussed above, though useful, have many drawbacks that prevent their widespread use on finer golf courses. For example, conventional prior art golf course sweepers have a single motor that drives one or both back wheels. Although some land vehicles have a limited slip differential that mechanically controls the speed of each wheel depending upon the condition of the surface or turning parameters, such arrangements are complicated, expensive, and can cause damage to the surface of the ground.

Conventional sweepers also have only crudely adjustable brush assembly heights. Because the brush can cause damage to the ground such prior art sweeper's brush assemblies often cause ground damage.

What is needed is a land vehicle that prevents ground damage caused with turning and prevents ground damage caused by a poorly adjustable brush assembly.

SUMMARY OF THE INVENTION

The land vehicle of the preferred embodiment is a sweeper machine which, in the preferred embodiment, prevents ground damage caused with turning and prevents ground damage caused by a poorly adjustable brush assembly. In the preferred embodiment, the sweeper machine generally comprises a frame, front wheels, rear wheels, a debris collection assembly comprising a rotary brush assembly and a paddle rotor, and a hopper. In the preferred embodiment, the sweeper machine is self-propelled and comprises and engine system comprising an engine, fuel tank, fuel lines, and fuel. The engine of this embodiment is a conventional and commercially available gasoline engine adapted to power a hydraulic system which comprises a hydraulic pump assembly, a reservoir, hydraulic fluid, hydraulic lines, and various valves, actuators, solenoids, cylinders, and motors. The engine is fluidly connected to a fuel supply stored in the fuel tank and is preferably started in a conventional manner such as by means of an electric starter electrically connected to a battery. The engine can also be started by other means well known in the art such as by a pull rope connected to a crankshaft of the engine. The battery and starter are part of the electrical system comprising the battery, electrical lines, the starter, controls, and actuators. The hydraulic pump assembly comprises a drive shaft, left and right hydraulic pumps and a third hydraulic pump. The drive shaft is operatively connected to the engine such that power from the engine causes the drive shaft to rotate.

The engine is further arranged to drive the rotary brush assembly and the paddle rotor. In the preferred embodiment, the rotary brush assembly and the paddle rotor are belt driven by one or more belts. The front and rear wheels of the preferred embodiment are formed from steel and are surrounded by respective polyurethane tires. The wheels and tires are wide such that a weight of the sweeper machine is distributed across a wide surface area which contacts the ground.

Each rear wheel is driven by a respective left and right wheel hydraulic motor. Each wheel hydraulic motor is fluidly connected to the respective left and right hydraulic pump via the hydraulic lines. As will be discussed in more detail below, each wheel hydraulic motor is adapted to move at the same or different speeds than the other depending upon the turning motion of the sweeper machine.

The hopper comprises a floor, sides, top, and front wall. The front wall comprises hopper intake opening through which debris is transferred by the paddle rotor. Opposite front wall is hopper lid which is hingedly attached to sides. The floor of the hopper slopes downwardly from front to rear. A dump opening is formed by the floor, the sides, and the top. The top comprises an angled configuration such that a front portion angles upward from front to rear to a position just short of a midway at which point the top levels. The hopper lid covers the dump opening when the hopper is in a collection position. When the hopper is in a full dump position, the hopper is lifted upward by hopper main cylinders, the hopper lid is extended outward by action of hopper lid cylinders which are pivotally connected, respectively, to the hopper sides and hopper extension members. The hopper extension members are pivotally connected at respective ends to respective hopper sides and the hopper lid. The hopper main cylinders and hopper lid cylinder are fluidly connected to the third hydraulic pump via the hydraulic lines. The hopper cylinders and hopper lid cylinder are adapted to be selectively activated by a user using hopper controls.

An operator station is mounted to the frame towards a front portion of the sweeper machine. The operator station comprises a seat, a floorboard, a steering assembly, hydraulic hand controls, and a foot control assembly. In the preferred embodiment, the operator station is open to the elements. However, in other embodiments, the operator station positioned within an enclosed cab portion with a windshield and one or more doors.

The steering assembly comprises a steering wheel and steering column mechanically coupled with the front wheels in a manner well known in the art. The foot control assembly comprises a forward pedal and a reverse pedal coupled a foot control lever such that the forward pedal, reverse pedal, and foot control lever when attached to one another surround a middle portion of a foot control bar. The foot control bar extends horizontally between left and right foot control retaining members. The foot control bar is coaxially aligned with, and adapted for radial rotation within, the left and right foot control retaining members. The left and right foot control retaining members are mounted to respective left and right foot control mounting brackets. The left and right foot control mounting brackets are secured to the frame. The foot control lever extends downward from the foot control bar. The floorboard comprises a slot through which the forward pedal and a reverse pedal extend.

Pivotally attached to a lower end of the foot control lever is foot control linkage bracket that is mechanically connected to an accelerator linkage lever via accelerator connection rod which is coupled to an accelerator linkage bracket. The accelerator linkage bracket is pivotally coupled to a lower end of the accelerator linkage lever. Thus, with this arrangement movement of the forward pedal or reverse pedal cause the foot control bar to rotate about its longitudinal axis. This axial rotation cause the foot control lever to move forward when the reverse pedal is depressed and rearward when the forward pedal is depressed. Such forward or rearward movement of the foot control lever causes corresponding forward or reverse movement of the accelerator linkage lever. Grease fittings provide a connection point for lubrication of the area between parts having relative rotation about one another.

The debris collection assembly comprises a collection body to which the rotary brush assembly and the paddle rotor assembly are rotatably attached and a lower unit assembly comprising a chute and a brush adjustment assembly. The collection body is adapted to be selectively moved vertically such that the collection body together with the chute can be raised and lowered with respect to the ground. Respective sides of the collection body are pivotally coupled to distal ends of respective lateral support arms. Proximal ends of the respective lateral support arms are pivotally coupled, directly or indirectly, to the frame.

In the preferred embodiment, the debris collection assembly is raised and lowered using one or more collection body cylinders. In the preferred embodiment, the debris collection assembly is raised and lowered using a single collection body cylinder positioned near the center of the sweeper machine. The collection body cylinder is fluidly connected to the third hydraulic pump via the hydraulic lines. The collection body cylinder is adapted to be selectively activated by a user using collection body cylinder controls. As the rotary brush assembly is part of the debris collection assembly, raising and lowering the debris collection assembly raises and lowers the rotary brush assembly.

The rotary brush assembly is adapted to be independently raised and lowered, by brush adjustment assemblies positioned adjacent to the respective sides of the collection body. Each brush adjustment assembly comprises an actuator comprising an extendable and retractable piston rod. A respective connector portion comprises an internally threaded tubular configuration and is adapted to receive an externally threaded clevis rod comprising a clevis fitting. Each respective clevis fitting is coupled to a respective rear end of a height adjustment lever. A front end of the height adjustment lever is pivotally attached to the collection body. Rotatably incorporated within a rear portion of each height adjustment lever is brush adjustment wheel.

The brush adjustment assembly is electronically connected to the battery and is adapted to be selectively activated by a user using brush adjustment assembly control. In the preferred embodiment, the adjustment assembly control is a single toggle switch. In the event the respective actuators/pistons become out of alignment such that, for example, the left side of the left side of the rotary brush assembly is higher than the right side, the operator can regain a desired alignment by either fully retracting or fully extending the piston.

In the preferred embodiment, the actuators are 12-volt actuators adapted to be powered by a 12-volt electrical system of the sweeper machine. The actuators are conventional and commercially available 12-volt actuators.

Each of the front wheels comprises respective yokes and left and right spindles. The spindles are mechanically linked to the steering column in a conventional manner such that rotational movement of the steering wheel causes corresponding rotational movement of the spindles, the yokes, and front wheels.

One or more of the front wheels is mechanically connected to an accelerator adjustment assembly. The right spindle comprises an accelerator adjustment linkage assembly. The accelerator adjustment linkage assembly comprises a horizontal plate comprising arcuate slots. Slidingly coupled to the arcuate slots are respective accelerator adjustment linkage brackets each of which is adapted to receive left and right steering cables. The left and right steering cables extend to, and are connected to, respective left and right steering cable receiving members of the accelerator adjustment assembly.

The accelerator adjustment assembly of the preferred embodiment comprises left and right linkage support brackets, a horizontal bar member, left and right tubular sleeve members, left and right retainer members, left and right main throttle adjustment members, left and right turning regulation members, left and right throttle linkage brackets, left and right pins, the accelerator linkage lever, left and right connecting rods, and left and right and motor linkage adapter portions.

The left and right linkage support brackets are attached to the frame. The left and right retainer members are fastened to respective tops of the left and right linkage support brackets and are adapted to receive the horizontal bar member such that the left and right retainer members and horizontal bar member are coaxially arranged. A right end of the horizontal bar member terminates within right retainer member adjacent to a cap that closes a right end of the right retainer member. The left retainer member comprises a through opening through which the horizontal bar member passes. Thus, the left retainer member supports a middle portion of horizontal bar member and a left portion of the horizontal bar member extends leftward from the left retainer member. Between the left and right retainer members, the right main throttle adjustment member is connected to the horizontal bar member. The left and right main throttle adjustment members each comprise an upper through opening which are respectively adapted to coaxially receive the horizontal bar member. The left main throttle adjustment member is a mirror image of the right main throttle adjustment member. Immediately to the left of the right main throttle adjustment member is the right turning regulation member. The right turning regulation member comprises an arcuate upper portion comprising an inside radius corresponding to an outside radius of right tubular sleeve member. The left turning regulation member is a mirror image of the right turning regulation member. The inside radius of the right turning regulation member is attached to the right tubular sleeve member. The right tubular sleeve member and horizontal bar member are coaxially arranged such that the right tubular sleeve member houses a portion of the horizontal bar member between the right main throttle adjustment member and a right side of the left retainer member. Also attached (e.g. welded) to the right tubular sleeve member is right steering cable receiving member.

At a left end of the horizontal bar member, the accelerator linkage lever is attached. The accelerator linkage lever comprises an upper through opening that coaxially receives and is attached (e.g. welded) to the left end of the horizontal bar member. Between the accelerator linkage lever and the left retainer member, the through opening of the left main throttle adjustment member is attached (e.g. welded) to the horizontal bar member. Immediately to the right of the left main throttle adjustment member is the left turning regulation member. The left turning regulation member is attached to the left tubular sleeve member in a corresponding manner as described above with respect to the right turning regulation member. The left steering cable receiving members is attached to the left tubular sleeve member in a corresponding manner as described above with respect to the right tubular sleeve member. The left tubular sleeve member and horizontal bar member are coaxially arranged such that the left tubular sleeve member houses a portion of the horizontal bar member between the left main throttle adjustment member and a left side of the left retainer member.

With the arrangement disclosed above, radial movement of accelerator linkage lever cause horizontal bar member to rotate within left and right retainer members and left and right tubular sleeve members. Radial movement of accelerator linkage lever also causes the left and right main throttle adjustment members to rotate. Grease fittings provide a connection point for lubrication of the area between parts having relative rotation about one another.

The left and right main throttle adjustment members comprise respective vertical through openings. The vertical through openings of the left and right main throttle adjustment members of the preferred embodiment are vertically arranged and comprise an ovular configuration.

The left and right turning regulation members comprise respective slanted through openings. The slanted through openings of the left and right turning regulation members of the preferred embodiment comprise ovular configurations and are slanted such that respective lower ends of the slanted through openings of the left and right turning regulation members are positioned nearer to the front.

The rotational orientation of the left and right main throttle adjustment members is determined by the position of the accelerator linkage lever (which position is determined by the position of the foot control assembly). The rotational orientation of the left and right turning regulation members is determined by the respective positions of the left and right steering cables (which positions are determined by the position of the steering wheel). The arrangement of the respective left and right main throttle adjustment members and left and right turning regulation members permits the throttle adjustment members and turning regulation members to rotate independently of one another. Thus, for example, an alignment relationship between the right vertical through opening and the right slanted through opening can be changed depending upon the position of the steering wheel and the foot control assembly.

In use it is desirable to avoid damaging the ground caused by turning of the sweeper machine. The sweeper machine of the present invention prevents such ground damage by reducing the relative speed of the tire rotation of the inside wheels during turns. In preferred embodiments, the turning radius of the sweeper machine is limited, which also prevents damage to the ground during turns. The following will discuss the operation of the accelerator adjustment assembly using as an example a right turning action of the sweeper machine. Those skilled in the art will readily be able to determine the action of the component parts with respect to other maneuvers.

In the preferred embodiment the land vehicle is a sweeper machine. However, in other embodiments, the land vehicle is another type of land vehicle such as a four-wheeler, an ATV, a side-by-side, a lawn mower, utility tractor, and the like. In such embodiments, the land vehicle does not have the hopper or brush and paddle arrangements or other components specific to sweeper machines. However, such embodiments do comprise the accelerator adjustment assembly.

BRIEF DESCRIPTION OF THE DRAWINGS

FIG. 3 is a left side elevation view of the sweeper machine accelerator adjustment assembly, in accordance with a preferred embodiment.

FIG. 4a is a perspective view of the sweeper machine front wheel assemblies, in accordance with a preferred embodiment.

FIG. 4b is a plan view of the right front wheel assembly in a non-turning position, in accordance with a preferred embodiment.

FIG. 4c is a plan view of the right front wheel assembly in a right-turning position, in accordance with a preferred embodiment.

FIG. 4d is a plan view of the right front wheel assembly in a left-turning position, in accordance with a preferred embodiment.

FIG. 7 is a perspective view of portions of the accelerator adjustment assembly of FIGS. 5 and 6.

FIG. 8 is a perspective view of right-side accelerator adjustment components in a first orientation, in accordance with a preferred embodiment.

FIG. 9 is a perspective view of right-side accelerator adjustment components in a second orientation, in accordance with a preferred embodiment.

FIG. 10 is an elevation view of the right main throttle adjustment member, in accordance with a preferred embodiment.

FIG. 11 is an elevation view of the right turning regulation member, in accordance with a preferred embodiment.

DESCRIPTION OF THE PREFERRED EMBODIMENT

Figure 1:
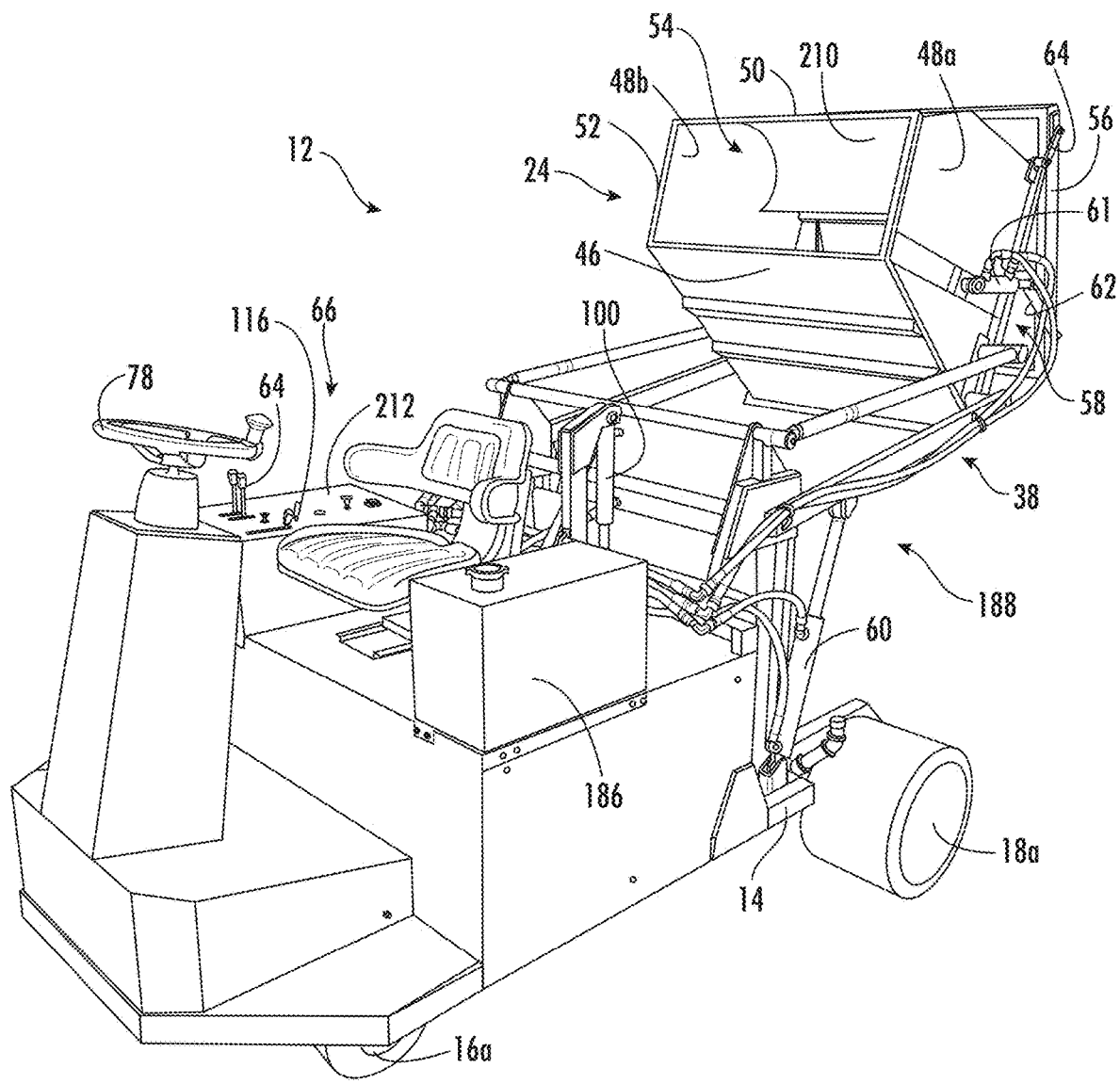
FIG. 1 is an isometric front, top, and left side view of the sweeper machine of the present invention, in accordance with a preferred embodiment.

Referring to FIG. 1, there is shown a vehicle 12 which, in accordance with preferred embodiments, is a sweeper machine 12. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will clearly enable one skilled in the art to make and use the invention, and describes several embodiments, adaptations, variations, alternatives, and uses of the invention, including what is presently believed to be the best mode of carrying out the invention.

Reference to "left", unless otherwise indicated shall correlate with what would be the driver's side of a U.S. passenger vehicle. Reference to "right", unless otherwise indicated shall correlate with what would be the passenger side of a U.S. passenger vehicle.

Figure 16:
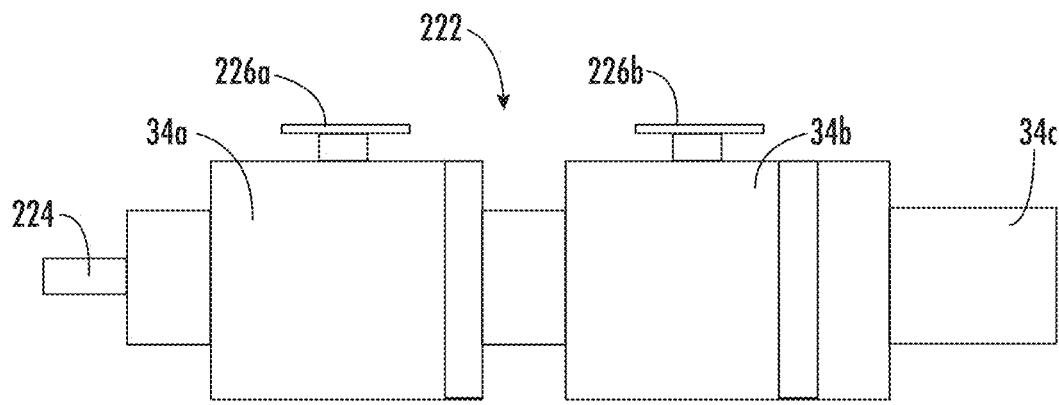
FIG. 16 is a conceptual view of the hydraulic pump assembly comprising two dedicated wheel pumps and a third pump, in accordance with a preferred embodiment.

Referring to the figures, the sweeper machine 12 of the preferred embodiment generally comprises a frame 14, front wheels 16a, 16b, rear wheels 18a, 18b, a debris collection assembly 188, comprising a rotary brush assembly 20 and a paddle rotor 22, and a hopper 24. In the preferred embodiment, the sweeper machine 12 is self-propelled and comprises and engine system 194 comprising an engine 26, fuel tank 186, fuel lines 196, and fuel 198. The engine 26 of this embodiment is a conventional and commercially available gasoline engine 26 adapted to power a hydraulic system 32 which comprises a hydraulic pump assembly 222, a reservoir 36, hydraulic fluid 192, hydraulic lines 38, and various valves, actuators, solenoids, cylinders, and motors. The engine 26 is fluidly connected to a fuel supply stored in a fuel tank 186. and is preferably started in a conventional manner such as by means of an electric starter 204 electrically connected to a battery 206. The engine 26 can also be started by other means well known in the art such as by a pull rope connected to a crankshaft of the engine 26. Referring to FIG. 16, in the preferred embodiment, the hydraulic pump assembly 222 comprises a drive shaft 224, left and right hydraulic pumps 34a, 34b and a third hydraulic pump 34c. The drive shaft 224 is operatively connected to the engine such that power from the engine causes the drive shaft to rotate.

The battery 206 and starter 204 are part of the electrical system 200 comprising the battery 206, electrical lines 202, the starter 204, controls 208, and actuators 104a, 104b.

The engine 26 is further arranged to drive the rotary brush assembly 20 and the paddle rotor 22. In the preferred embodiment, the rotary brush assembly 20 and the paddle rotor 22 are belt driven by one or more belts 44. The front wheels 16a, 16b and rear wheels 18a, 18b of the preferred embodiment are formed from steel and are surrounded by respective polyurethane tires 40a, 40b, 42a, 42b. The polyurethane of these tires is relatively hard such that they resist deformation. In the preferred embodiment each tire has a Shore A hardness of 40-55. The rear wheels 18a, 18b comprise a larger diameter than diameters of each of the front wheels 16a, 16b. The respective wheels 16a, 16b, 18a, 18b and respective tires 40a, 40b, 42a, 42b are wide such that a weight of the sweeper machine 12 is distributed across a wide surface area which contacts the ground 10. The width of the tires 40a, 40b, 42a, 42b has the added benefit of helping to prevent weight from being undesirably concentrated on one side of the sweeper machine 12. In certain embodiments, such as that shown in FIG. 4a, there are two left front wheels 16a, 16a and two left front tires 40a, 40a as well as two left front wheels 16b, 16b and two left front tires 40b, 40b. The individual sets of these pairs of respective wheels and tires 16a, 40a, 16a, 40a; 16b, 40b, 16b, 40b are spaced apart a distance of less than ⅛ inch which permits two respective wheels and tires to rotate at different speeds and even counter rotate while the front wheel assemblies are being turned. Thus, for example, wheel/tire set 16a, 40a is set apart from adjacent wheel/tire set 16a, 40a by less than ⅛ inch.

In the preferred embodiment, each of the front wheels 16a, 16b and front tires 40a, 40b have a combined height of approximately 9⅝ inches and a width (from sidewall to sidewall) of approximately 5 inches. Each tire 40a, 40b, 42a, 42b has a relatively smooth tread surface that comes in contact with the ground 10.

Each rear wheel 18a, 18b of the preferred embodiment is driven by a respective left and right wheel hydraulic motor 28a, 28b. Each wheel hydraulic motor 28a, 28b is fluidly connected to the respective left and right hydraulic pump 34a, 34b via the hydraulic lines 38. As will be discussed in more detail below, each wheel hydraulic motor 28a, 28b is adapted to move at the same or different speeds than the other depending upon the turning motion of the sweeper machine 12.

Figure 2:
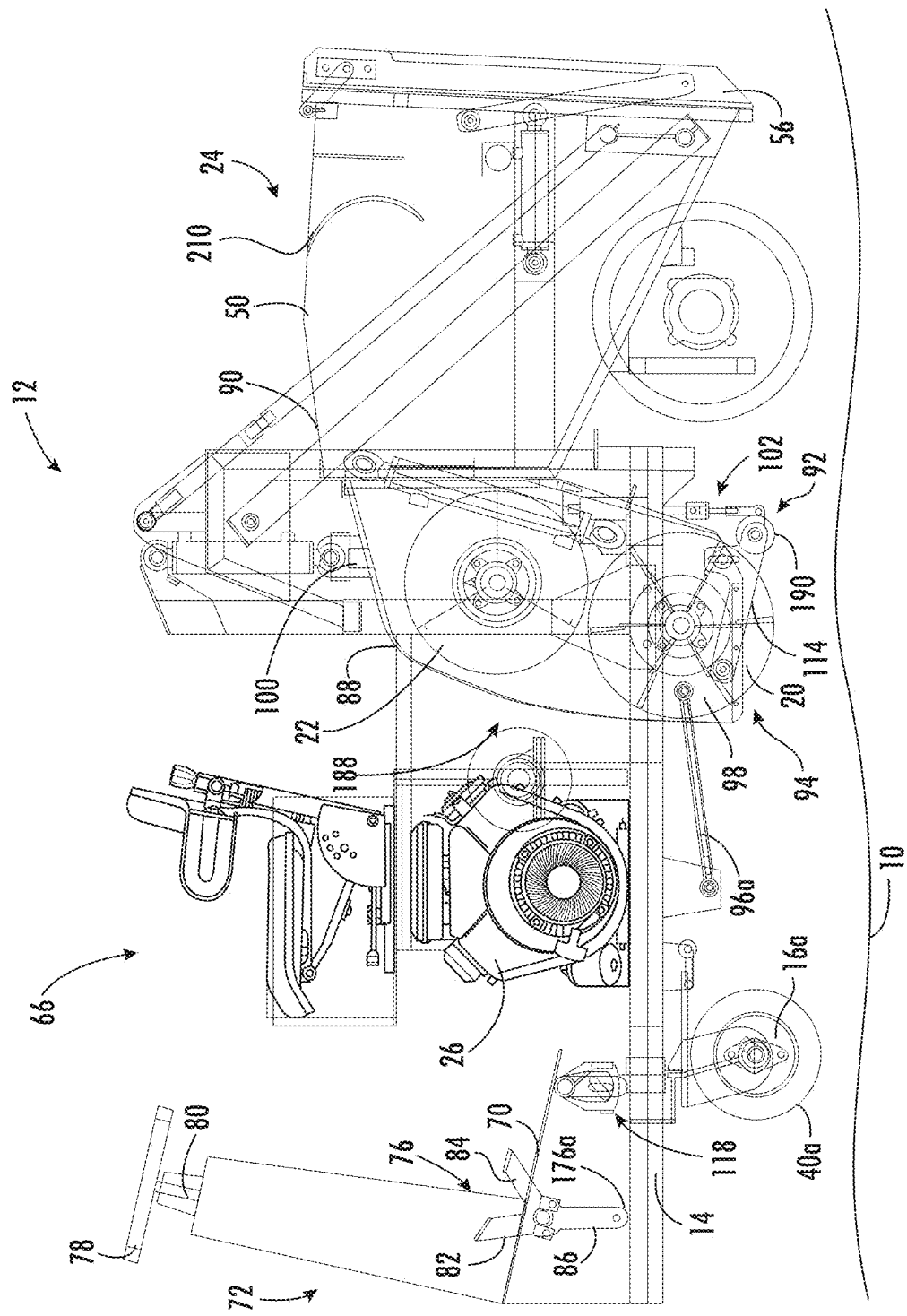
FIG. 2 is a partial x Ray, left side elevation view of the sweeper machine of FIG. 1.
Figure 5:
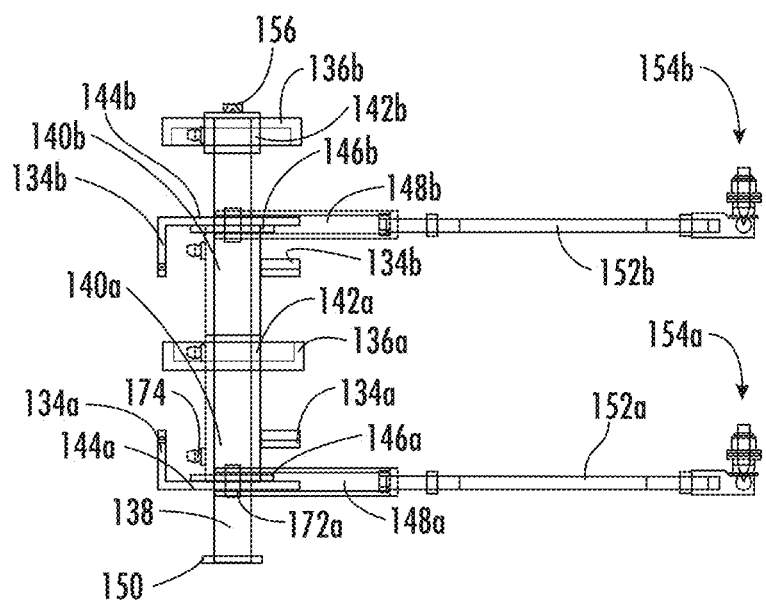
FIG. 5 is a plan view of the accelerator adjustment assembly, in accordance with a preferred embodiment.

Referring to FIGS. 1 and 2, the hopper 24 comprises a floor 46, sides 48a, 48b, top 50, and front wall 52. The front wall 52 comprises hopper intake opening 54 through which debris is transferred by the paddle rotor 22. Opposite front wall 52 is hopper lid 56 which is hingedly attached to sides 48a, 48b. The floor 46 of the hopper 24 slopes downwardly from front to rear. A dump opening 58 is formed by the floor 46, the sides 48a, 48b, and the top 50. The hopper 24 further comprises a deflector 210, which in the preferred embodiment is an arcuate portion spanning across the interior of the hopper 24 which is adapted to direct large particulates and debris towards the floor 46 of the hopper 24. An opening in an upper section of the hopper lid 56 permits air to pass through the hopper lid 56. Larger particulates and debris are thus stored in the hopper 24 while air is allowed to flow out.

The top 50 comprises an angled configuration such that a front portion 90 angles upward from front to rear to a position just short of a midway at which point the top 50 levels. The hopper lid 56 covers the dump opening 58 when the hopper 24 is in a collection position as shown, for example, in FIG. 2. When the hopper 24 is in a full dump position, as shown for example in FIG. 1, the hopper 24 is lifted upward by hopper main cylinders 60, the hopper lid 56 is extended outward by action of hopper lid cylinders 61 which are pivotally connected, respectively, to the hopper sides 48a, 48b and hopper extension members 62, 64. The hopper extension members 62a, 62a are pivotally connected at respective ends to respective hopper sides 48a, 48b and the hopper lid 56. The hopper main cylinders 60a, 60b and hopper lid cylinder 61 are fluidly connected to the third hydraulic pump 34c via the hydraulic lines 38. The hopper cylinders 60 and hopper lid cylinder 61 are adapted to be selectively activated by a user using hopper controls 65.

An operator station 66 is mounted to the frame 14 towards a front portion of the sweeper machine 12. The operator station 66 comprises a seat 68, a console 212, a floorboard 70, a steering assembly 72, hydraulic hand controls 74, and a foot control assembly 76. The console 212 comprises an angled upper surface, which in the preferred embodiment, is at a 45-degree angle which permits rain/condensation to roll off rather than collect on controls housed within the console 212. In the preferred embodiment, the operator station 66 is open to the elements. However, in other embodiments, the operator station 66 positioned within an enclosed cab portion with a windshield and one or more doors.

The steering assembly 72 comprises a steering mechanism 78 (which in the preferred embodiment is steering wheel 78) and steering column 80 operatively coupled with the front wheels 16a, 16b in a manner well known in the art. Although the steering mechanism 78 of the preferred embodiment is a steering wheel 78, the steering mechanism need not be a steering wheel 78. In other embodiments, the steering mechanism 78 can be one or more levers, paddles, joy sticks, and other steering mechanisms 78 known in the art. The steering mechanism 78 can be mechanically linked to the front wheels 16a, 16b by a steering column 80 as, for example, in the preferred embodiment. In other embodiments, the steering mechanism 78 is electronically or hydraulically linked to the front wheels 16a, 16b in a manner adapted to turn the front wheels upon selected movement of the steering mechanism 78.

Figure 6:
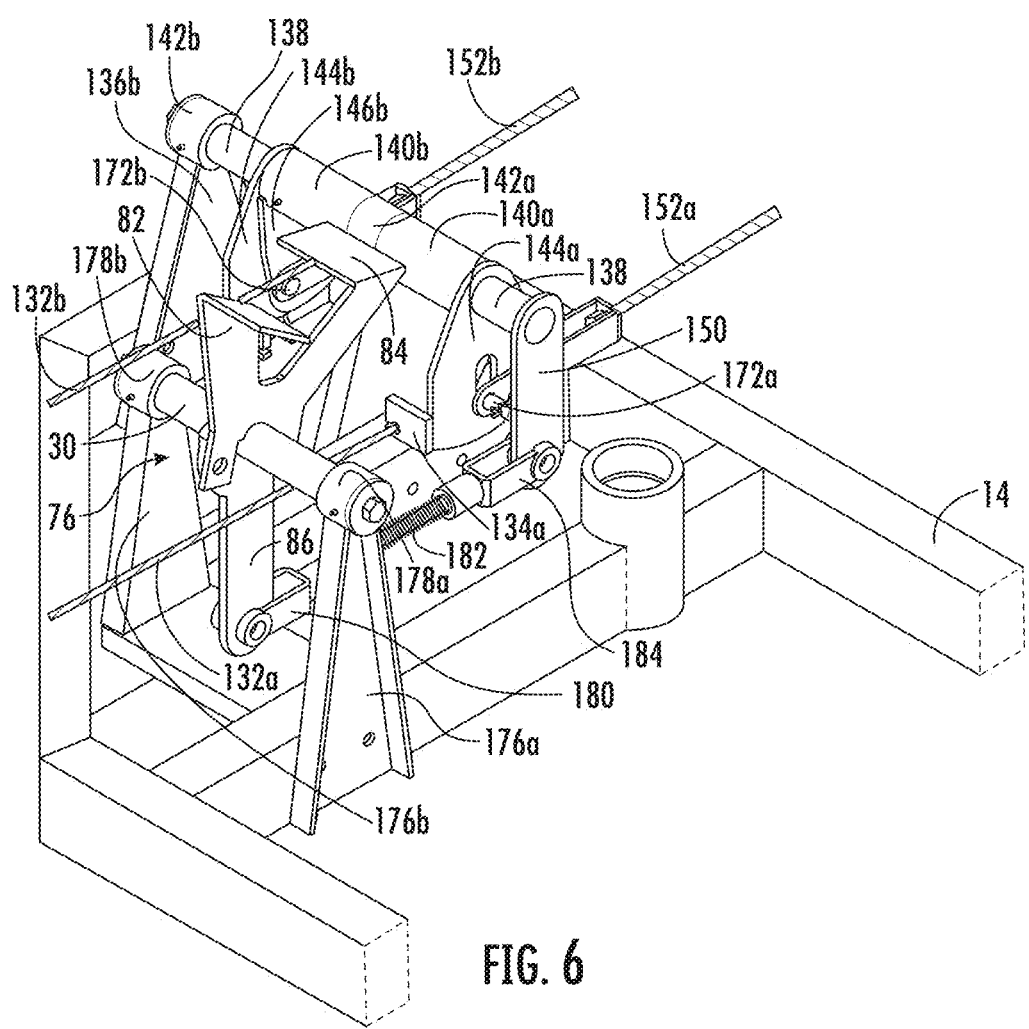
FIG. 6 is a perspective view of the accelerator adjustment assembly and foot control assembly, in accordance with a preferred embodiment.
Figure 12A:
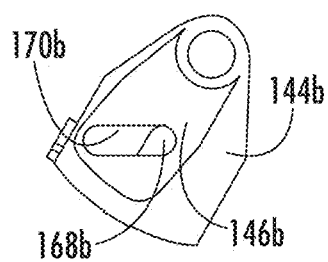
FIGS. 12a-12f depict the right main throttle adjustment member and right turning regulation member in various orientations, in accordance with a preferred embodiment.
Figure 12B:
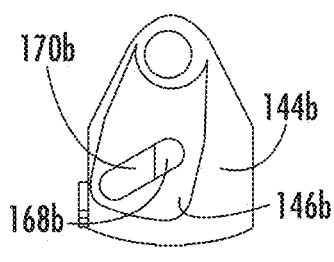
Figure 12C:
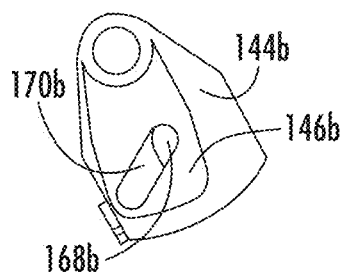
Figure 12D:
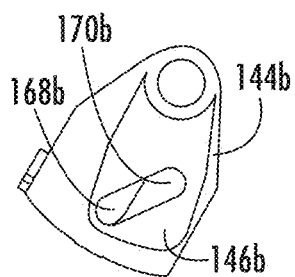
Figure 12E:
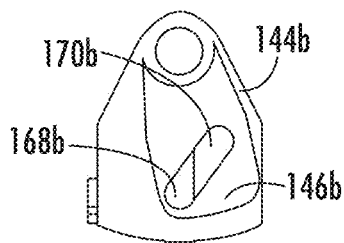
Figure 12F:
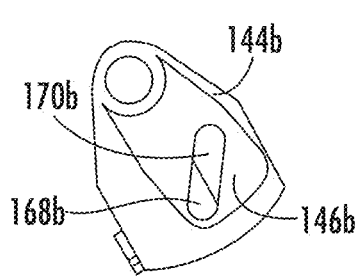

The foot control assembly 76, as shown, for example, in FIG. 6, comprises a forward pedal 82 and a reverse pedal 84 coupled a foot control lever 86 such that the forward pedal 82, reverse pedal 84, and foot control lever 86 when attached to one another surround a middle portion of a foot control bar 30. The foot control bar 30 extends horizontally between left and right foot control retaining members 178a, 178b. The foot control bar 30 is coaxially aligned with, and adapted for radial rotation within, the left and right foot control retaining members 178a, 178b. The left and right foot control retaining members 178a, 178b are mounted to respective left and right foot control mounting brackets 176a, 176b. The left and right foot control mounting brackets 176a, 176b are secured to the frame 14. The foot control lever 86 extends downward from the foot control bar 30. The floorboard 70 comprises a slot through which the forward pedal 82 and a reverse pedal 84 extend.

Pivotally attached to a lower end of the foot control lever 86 is foot control linkage bracket 180 that is mechanically connected to an accelerator linkage lever 150 via accelerator connection rod 182 which is coupled to an accelerator linkage bracket 184. The accelerator linkage bracket 184 is pivotally coupled to a lower end of the accelerator linkage lever 150. Thus, with this arrangement movement of the forward pedal 82 or reverse pedal 84 cause the foot control bar to rotate about its 30 longitudinal axis. This axial rotation cause the foot control lever 86 to move forward when the reverse pedal 84 is depressed and rearward when the forward pedal 82 is depressed. Such forward or rearward movement of the foot control lever 86 causes corresponding forward or reverse movement of the accelerator linkage lever 150. Grease fittings 174 provide a connection point for lubrication of the area between parts having relative rotation about one another.

The debris collection assembly 188 comprises a collection body 88 to which the rotary brush assembly 20 and the paddle rotor 22 assembly are rotatably attached and a lower unit assembly 92 comprising a chute 94 and a brush adjustment assembly 102. The collection body 88 is adapted to be selectively moved vertically such that the collection body 88 together with the chute can be raised and lowered with respect to the ground 10. Respective sides 98 of the collection body 88 are pivotally coupled to distal ends of respective lateral support arms 96. Proximal ends of the respective lateral support arms 96a, 96b are pivotally coupled, directly or indirectly, to the frame 14.

In the preferred embodiment, the debris collection assembly 188 is raised and lowered using one or more collection body cylinders 100. In the preferred embodiment, the debris collection assembly 188 is raised and lowered using a single collection body cylinder 100 positioned near the center of the sweeper machine 12. The collection body cylinder 100 is fluidly connected to the third hydraulic pump 34c via the hydraulic lines 38. The collection body cylinder 100 is adapted to be selectively activated by a user using collection body cylinder controls 64. As the rotary brush assembly 20 is part of the debris collection assembly 188, raising and lowering the debris collection assembly 188 raises and lowers the rotary brush assembly 20. In the preferred embodiment, the collection body cylinder 100 is set to "float" such that the height of the rotary brush assembly 20 is adjusted in accordance with the pre-determined brush adjustment assembly setting.

Figures 13A, 13B, 13C:
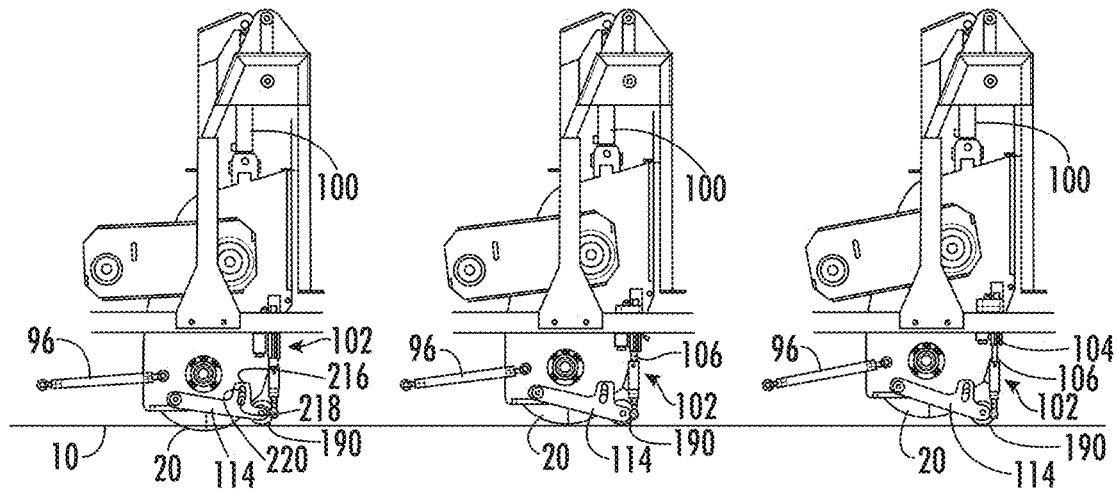
FIGS. 13a-13c depict the brush adjustment assembly in various orientations, in accordance with a preferred embodiment.

Referring to FIGS. 3, 13a-13c, and 14a-14c, the rotary brush assembly 20 is adapted to be independently raised and lowered, by brush adjustment assemblies 102 positioned adjacent to the respective sides 98 of the collection body 88. Referring to FIG. 3, each brush adjustment assembly 102 comprises an actuator 104 comprising an extendable and retractable piston rod 106. A respective connector portion 112 comprises an internally threaded tubular configuration and is adapted to receive an externally threaded clevis rod 108 comprising a clevis fitting 110. Each respective clevis fitting 110 is coupled to a respective rear end of a height adjustment lever 114. A front end of the height adjustment lever 114 is pivotally attached to the collection body 88. Rotatably incorporated within a rear portion of each respective height adjustment lever 114 is brush adjustment wheel 190. In the preferred embodiment, the lateral support arms 96a, 96b each comprises an upper portion 216 comprising a slot 220, the slot 220 being adapted to slide over a height adjustment pin 218 mounted to the collection body 88 (FIG. 13a). This slot 220 and pin 218 arrangement limits the length of travel of the height adjustment lever 114.

Referring to FIGS. 13a-13c, there is shown the debris collection assembly 188 in three different orientations. In FIG. 13a, the collection body cylinder 100 is near-fully extended such that a lowermost portion of the rotary brush assembly 20 extends slightly below the ground 10 and piston rod 106 is retracted such that the brush adjustment wheel 190 is even with the ground 10 and slightly elevated with respect to the lowermost portion of the rotary brush assembly 20. In FIG. 13b, the collection body cylinder 100 is intermediately extended such that the lowermost portion of the rotary brush assembly 20 extends even with the ground 10 and piston rod 106 is intermediately extended such that the brush adjustment wheel 190 is even with the ground 10 and as well as with respect to the lowermost portion of the rotary brush assembly 20. In FIG. 13c, the collection body cylinder 100 is in a near retracted position such that the lowermost portion of the rotary brush assembly 20 extends even with the ground 10 and piston rod 106 is near fully extended such that the brush adjustment wheel 190 is even with the ground 10 and below the lowermost portion of the rotary brush assembly 20.

Figures 14A, 14B, 14C:
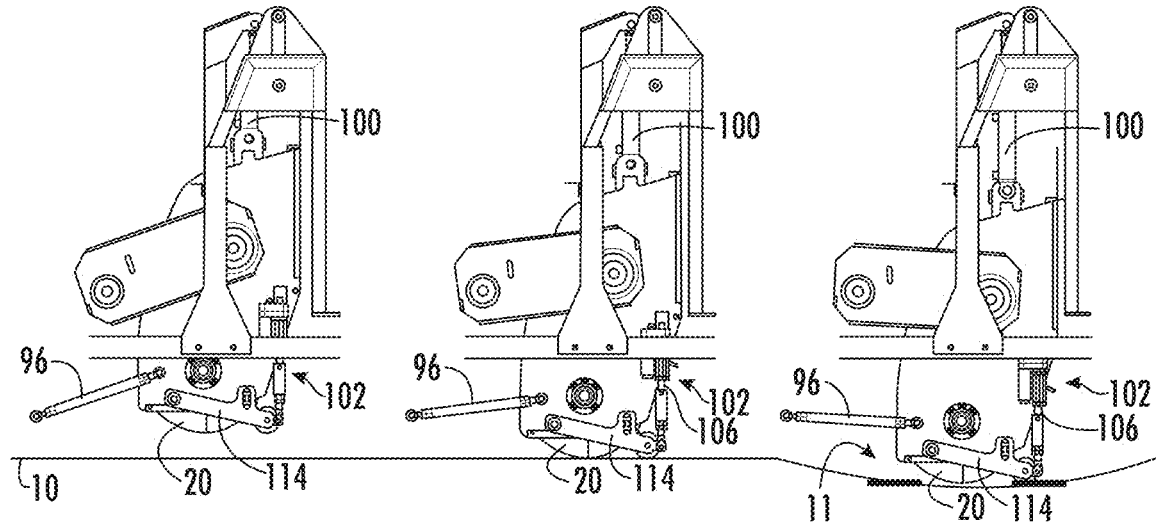
FIGS. 14a-14c depict the brush adjustment assembly in various orientations, in accordance with a preferred embodiment.
Figure 15:
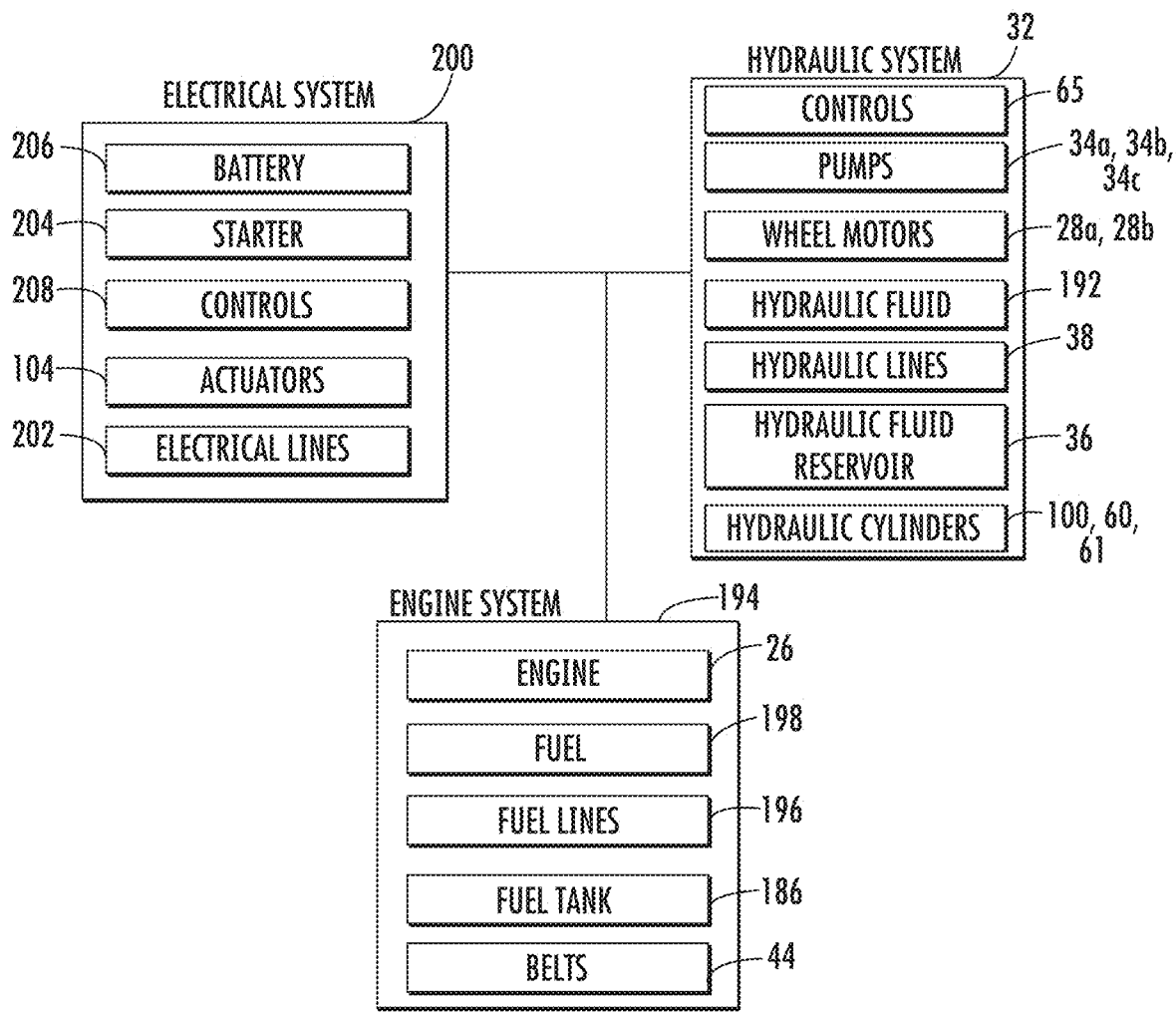
FIG. 15 is a block diagram depicting major systems and system components of the sweeper machine, in accordance with a preferred embodiment.

Referring to FIGS. 14a-14c, there is shown the debris collection assembly 188 in three different additional orientations. In FIG. 14a, the collection body cylinder 100 is near-fully retracted such that a lowermost portion of the rotary brush assembly 20 is above the ground 10 and piston rod 106 is retracted such that the brush adjustment wheel 190 is even with the lowermost portion of the rotary brush assembly 20. In FIG. 14b, the collection body cylinder 100 is intermediately extended such that the lowermost portion of the rotary brush assembly 20 extends even with the ground 10 and piston rod 106 is intermediately extended such that the brush adjustment wheel 190 is even with the ground 10 and as well as with respect to the lowermost portion of the rotary brush assembly 20 (the positions depicted in FIGS. 13b and 14b are identical). The collection body cylinder 100 is structured and arranged to selectively float such that the rotary brush assembly 20 remains in contact with an undulating ground surface 10. In FIG. 14c, the collection body cylinder 100 is in a near fully extended such that the lowermost portion of the rotary brush assembly 20 extends nearly even with the ground 10 in a depression area 11 of undulating ground 10 (an area where the ground 10 is lower than the ground in FIGS. 14a and 14b) and piston rod 106 is intermediately extended such that the brush adjustment wheel 190 is even with the ground 10 and the lowermost portion of the rotary brush assembly 20.

The brush adjustment assembly 102 is electronically connected to the battery and is adapted to be selectively activated by a user using brush adjustment assembly control 116. In the preferred embodiment, the adjustment assembly control 116 is a single toggle switch 116. In the event the respective actuators/pistons 104/106 become out of alignment such that, for example, the left side of the left side of the rotary brush assembly 20 is higher than the right side, the operator can regain a desired alignment by either fully retracting or fully extending the piston 106.

In the preferred embodiment, the actuators 104a, 104b are 12-volt actuators 104 adapted to be powered by a 12-volt electrical system 200 of the sweeper machine 12. The actuators 104, 104 are conventional and commercially available 12-volt actuators sold under the brand name ELECTRAK MD.

In the preferred embodiment, each of the front wheels 16a, 16b comprises respective yokes 120a, 120b and left and right spindles 122a, 122b. The spindles 122a, 122b are mechanically linked to the steering column 80 in a conventional manner such that rotational movement of the steering wheel 78 causes corresponding rotational movement of the spindles 122a, 122b, the yokes 120a, 120b, and front wheels 16a, 16b.

Referring to FIGS. 4a-12f, one or more of the front wheels 16a, 16b is mechanically connected to an accelerator adjustment assembly 118. As shown in FIG. 4a, the right spindle 122b comprises an accelerator adjustment linkage assembly 124. The accelerator adjustment linkage assembly 124 comprises a horizontal plate 126 comprising arcuate slots 128a, 128b. The horizontal plate 126 and at least one of the one or more front wheels 16a, 16b share a vertical axis 214 (FIG. 4a) about which the horizontal plate 126 and front wheel to which it is attached 16b rotate. Slidingly coupled to the arcuate slots 128a, 128b are respective accelerator adjustment linkage brackets 130a, 130b each of which is adapted to receive left and right steering cables 132a, 132b. The left and right steering cables 132a, 132b. extend to, and are connected to, respective left and right steering cable receiving members 134a, 134b of the accelerator adjustment assembly 118.

As shown in FIGS. 5-11, the accelerator adjustment assembly 118 of the preferred embodiment comprises left and right linkage support brackets 136a, 136b, a horizontal bar member 138, left and right tubular sleeve members 140a, 140b, left and right retainer members 142a, 142b, left and right main throttle adjustment members 144a, 144b, left and right turning regulation members 146a, 146b, left and right throttle linkage brackets 148a, 148b, left and right pins 172a, the accelerator linkage lever 150, left and right connecting rods 152a, 152b, and left and right and motor linkage adapter portions 154a, 154b. The left and right and motor linkage adapter portions 154a, 154b link directly to respective motor linkages 226a, 226b of the respective left and right hydraulic pumps 34a, 34b.

The left and right linkage support brackets 136a, 136b are attached to the frame 14. The left and right retainer members 142a, 142b are fastened to respective tops of the left and right linkage support brackets 136a, 136b and are adapted to receive the horizontal bar member 138 such that the left and right retainer members 142a, 142b and horizontal bar member 138 are coaxially arranged. A right end of the horizontal bar member 138 terminates within right retainer member 142b adjacent to a cap 156 that closes a right end of the right retainer member 142b. The left retainer member 142a comprises a through opening through which the horizontal bar member 138 passes. Thus, the left retainer member 142a supports a middle portion of horizontal bar member 138 and a left portion of the horizontal bar member 138 extends leftward from the left retainer member 142a. Between the left and right retainer members 142a, 142b, the right main throttle adjustment member 144b is connected to the horizontal bar member 138. Referring to FIG. 10, the left and right main throttle adjustment members 144a, 144b each comprise an upper through opening 158a, 158b which are respectively adapted to coaxially receive the horizontal bar member 138. Although FIG. 10 depicts the right main throttle adjustment member 144b, the left main throttle adjustment member 144a is a mirror image of the right main throttle adjustment member 144b. Immediately to the left of the right main throttle adjustment member 144b is the right turning regulation member 146b. As shown in FIG. 11, the right turning regulation member 146b comprises an arcuate upper portion 160 comprising an inside radius 162 corresponding to an outside radius 164 of right tubular sleeve member 140b (Although FIG. 11 depicts the right turning regulation member 146b, the left turning regulation member 146a is a mirror image of the right turning regulation member 146b). The inside radius 162 of the right turning regulation member 146b is attached to the right tubular sleeve member 140b. The right tubular sleeve member 140b and horizontal bar member 138 are coaxially arranged such that the right tubular sleeve member 140b houses a portion of the horizontal bar member 138 between the right main throttle adjustment member 144b and a right side of the left retainer member 142a. Also attached (e.g. welded) to the right tubular sleeve member 140b is right steering cable receiving member 134b.

At a left end of the horizontal bar member 138, the accelerator linkage lever 150 is attached. The accelerator linkage lever 150 comprises an upper through opening 166 that coaxially receives and is attached (e.g. welded) to the left end of the horizontal bar member 138. Between the accelerator linkage lever 150 and the left retainer member 142a, the through opening 158a of the left main throttle adjustment member 144a is attached (e.g. welded) to the horizontal bar member 138. Immediately to the right of the left main throttle adjustment member 144a is the left turning regulation member 146a. The left turning regulation member 146a is attached to the left tubular sleeve member 140a in a corresponding manner as described above with respect to the right turning regulation member 146b. The left steering cable receiving members 134a is attached to the left tubular sleeve member 140a in a corresponding manner as described above with respect to the right tubular sleeve member 140b. The left tubular sleeve member 140a and horizontal bar member 138 are coaxially arranged such that the left tubular sleeve member 140a houses a portion of the horizontal bar member 138 between the left main throttle adjustment member 144a and a left side of the left retainer member 142a.

With the arrangement disclosed above, radial movement of accelerator linkage lever 150 cause horizontal bar member 138 to rotate within left and right retainer members 142a, 142b and left and right tubular sleeve members 140a, 140b. Radial movement of accelerator linkage lever 150 also causes the left and right main throttle adjustment members 144a, 144b to rotate. Grease fittings 174 provide a connection point for lubrication of the area between parts having relative rotation about one another.

As will be discussed in more detail below, and as shown for example, in FIGS. 10 and 11 (which show the right main throttle adjustment member 144b and right turning regulation member 170b), the left and right main throttle adjustment members 144a, 144b comprise respective vertical through openings 168a, 168b. The vertical through openings 168a, 168b of the left and right main throttle adjustment members 144a, 144b of the preferred embodiment are vertically arranged and comprise an ovular configuration.

The left and right turning regulation members 146a, 146b comprise respective slanted through openings 170a, 170b. The slanted through openings 170a, 170b of the left and right turning regulation members 146a, 146b of the preferred embodiment comprise ovular configurations and are slanted such that respective lower ends of the slanted through openings 170a, 170b of the left and right turning regulation members 146a, 146b are positioned nearer to the front.

The rotational orientation of the left and right main throttle adjustment members 144a, 144b is determined by the position of the accelerator linkage lever 150 (which position is determined by the position of the foot control assembly 76). The rotational orientation of the left and right turning regulation members 146a, 146b is determined by the respective positions of the left and right steering cables 132a, 132b (which positions are determined by the position of the steering wheel 78). The arrangement of the respective left and right main throttle adjustment members 144a, 144b and left and right turning regulation members 146a, 146b permits the throttle adjustment members 144a, 144b and turning regulation members 146a, 146b to rotate independently of one another. Thus, for example, an alignment relationship between the right vertical through opening 168b and the right slanted through opening 170b can be changed depending upon the position of the steering wheel 78 and the foot control assembly 76. FIGS. 12a-12f shows by way of example, different points of overlap of the right vertical through opening 168b and the right slanted through opening 170b. As the pin 172b of the right throttle linkage bracket 148b is inserted through both the right vertical through opening 168b and the right slanted through opening 170b, a change in the point of overlap between the two openings 168b, 170b, changes the position of the right throttle linkage bracket 148b which ultimately controls the right wheel motor 28b.

In use it is desirable to avoid damaging the ground 10 caused by turning of the sweeper machine 12. The sweeper machine 12 of the present invention prevents such ground damage by reducing the relative speed of the tire rotation of the inside wheels during turns. In preferred embodiments, the turning radius of the sweeper machine 12 is limited, which also prevents damage to the ground 10 during turns. The following will discuss the operation of the accelerator adjustment assembly 118 using as an example a right turning action of the sweeper machine 12. Those skilled in the art will readily be able to determine the action of the component parts with respect to other maneuvers. Referring to FIGS. 4a-4d, in operation, when a right turn is made as shown, for example, in FIG. 4c, the right rear wheel 18b is the inside motorized wheel 18b. As may be seen in FIGS. 5 & 6, right steering cable 132b controls the operation of the right rear wheel 18a, via the accelerator adjustment assembly 118 discussed above. Turning the steering wheel 78 to the right results in the front right wheel 16b turning to the right as shown in FIG. 4c which causes the horizontal plate 126 to rotate counterclockwise. This counterclockwise action causes right steering cable 132b to be pulled. This pulling of right steering cable 132b causes right steering cable receiving member 134b to be pulled as shown in FIG. 9. This pulling of the right steering cable receiving member 134b causes the right tubular sleeve member 140b to rotate which, in turn causes a lower portion of the right turning regulation member 146b to rotate forward (towards the front). This rotation of the right turning regulation member 146b causes the right pin 172b of the right throttle linkage bracket 148b to move upward and rearward. This rearward action of the right pin 172b of the right throttle linkage bracket 148b causes the right connecting rod 152b and right motor linkage adapter portions 154a, 154b to cause the right wheel hydraulic motor 28b to slow the rotation of the right rear wheel 16b. Similarly, the left steering cable 132a which controls operation of the outside wheel, which in this example is the left rear wheel 18a, slides through the slot 128b. The process described above, causes the no change to the rotation of the left rear wheel 18a.

In the preferred embodiment, there is a return spring (not shown) to push right turning regulation member 146b back to a normal position when slack is allowed on the right steering cable 132b by steering straight. The right steering cable 132b passes through this spring and the spring rests between the right main throttle adjustment member 144b and the right steering cable receiving member 134b such that rotational movement of the right tubular sleeve member 140b compresses said spring.

In the preferred embodiment the land vehicle 12 is a sweeper machine 12. However, in other embodiments, the land vehicle 12 is another type of land vehicle such as a four-wheeler, an ATV, a side-by-side, a lawn mower, or a utility tractor, and the like. In such embodiments, the land vehicle 12 does not have the hopper 24 or the brush assembly 20 and paddle rotor 22 arrangements or other components specific to a sweeper machine. However, such embodiments comprise the accelerator adjustment assemblies and related components described herein.

We claim:

1. A land vehicle comprising:
a frame, an engine, and a steering mechanism, the steering mechanism being adapted to control a direction of travel of the land vehicle;
one or more front wheels and two or more rear wheels;
the two or more rear wheels comprising a left rear wheel and a right rear wheel;
the land vehicle further comprising a first wheel motor adapted to control a rate of rotation of the left rear wheel;
a second wheel motor adapted to control a rate of rotation of the right rear wheel;
an accelerator adjustment assembly adapted to control the first and second wheel motors;
the accelerator adjustment assembly comprising a first linkage assembly operatively positioned between the steering mechanism and the first wheel motor;
the accelerator adjustment assembly comprising a second linkage assembly operatively positioned between the steering mechanism and the second wheel motor;
wherein, the first linkage assembly is structured and arranged to cause the first wheel motor to slow the rate of rotation of the left rear wheel during a left turn exceeding a predetermined left turning radius;
wherein, the second linkage assembly causes the second wheel motor to slow the rate of rotation of the right rear wheel during a right turn exceeding a predetermined right turning radius.

2. The land vehicle of claim 1, further comprising one or more hydraulic pumps, the one or more hydraulic pumps being fluidly connected to the first and second wheel motors.

3. The land vehicle of claim 2, the first and second linkage assemblies each comprising a linkage support adaptor connected to the one or more hydraulic pumps.

4. The land vehicle of claim 3, further comprising first and second steering cables, the first steering cable being connected to the first linkage assembly, the second steering cable being connected to the second linkage assembly.

5. The land vehicle of claim 4, the first and second steering cables being attached to respective first and second linkage brackets, the first and second linkage brackets being positioned adjacent to the one or more front wheels such that the first and second linkage brackets move upon movement of at least one of the one or more front wheels.

6. The land vehicle of claim 5, wherein the first and second linkage brackets are slidingly positioned within slots of a horizontal plate, the horizontal plate and at least one of the one or more front wheels sharing a vertical axis about which the horizontal plate and at least one of the one or more front wheels rotate.

7. The land vehicle of claim 1, wherein the land vehicle is a sweeper machine comprising a debris collection assembly, and a hopper.

8. A sweeper machine comprising:
a debris collection assembly comprising a collection body, a brush adjustment assembly, and a rotary brush assembly, the rotary brush assembly being rotationally mounted within the collection body such that the rotary brush assembly is adapted to rotate about a central horizontal axis;
a hydraulic cylinder adapted to lift and lower the debris collection assembly;
the brush adjustment assembly comprising an actuator comprising a piston rod, the piston rod being adapted to be selectively extendable and retractable;
a height adjustment lever comprising first and second ends;
the piston rod being operatively coupled to the first end of the height adjustment lever;
the second end of the height adjustment lever being pivotally connected to the collection body;
the piston rod being adapted to raise and lower the first end of the height adjustment lever such that the rotary brush assembly is raised and lowered;
the hydraulic cylinder being structured and arranged to selectively float such that the rotary brush assembly remains in contact with an undulating ground surface.

9. The sweeper machine of claim 8, wherein the first end of the height adjustment lever comprises a wheel.

10. The sweeper machine of claim 8 further comprising a lateral support arm, the lateral support arm comprising first and second ends, the first end of the lateral support arm being pivotally connected to the collection body, the second end of the lateral support arm being pivotally connected to a sweeper machine frame.

11. The sweeper machine of claim 10, the lateral support arm comprising an upper portion comprising a slot, the slot being adapted to slide over a height adjustment pin mounted to the collection body.

12. A sweeper machine comprising:
a frame, an engine, and a steering mechanism, the steering mechanism being adapted to control a direction of travel of the sweeper machine;
one or more front wheels, two or more rear wheels, a debris collection assembly, and a hopper;
a hydraulic cylinder adapted to lift and lower the debris collection assembly;
the two or more rear wheels comprising a left rear wheel and a right rear wheel;
the sweeper machine further comprising a first wheel motor adapted to control a rate of rotation of the left rear wheel;
a second wheel motor adapted to control a rate of rotation of the right rear wheel;
an accelerator adjustment assembly adapted to control the first and second wheel motors;

the accelerator adjustment assembly comprising a first linkage assembly operatively positioned between the steering mechanism and the first wheel motor;

the accelerator adjustment assembly comprising a second linkage assembly operatively positioned between the steering mechanism and the second wheel motor;

wherein, the first linkage assembly is structured and arranged to cause the first wheel motor to slow the rate of rotation of the left rear wheel during a left turn exceeding a predetermined left turning radius;

wherein, the second linkage assembly causes the second wheel motor to slow the rate of rotation of the right rear wheel during a right turn exceeding a predetermined right turning radius;

the debris collection assembly comprising a collection body, a brush adjustment assembly, and a rotary brush assembly, the rotary brush assembly being rotationally mounted within the collection body such that the rotary brush assembly is adapted to rotate about a central horizontal axis;

the brush adjustment assembly comprising an actuator;

the actuator comprising a piston rod, the piston rod being adapted to be selectively extendable and retractable;

the piston rod being operatively coupled to a first end of a height adjustment lever, a second end of the height adjustment lever being pivotally connected to the collection body;

the piston rod being adapted to raise and lower the first end of the height adjustment lever such that the rotary brush assembly is raised and lowered.

13. The sweeper machine of claim 12, further comprising one or more hydraulic pumps, the one or more hydraulic pumps being fluidly connected to the first and second wheel motors and the hydraulic cylinder.

14. The sweeper machine of claim 13, the first and second linkage assemblies each comprising a linkage support adaptor connected to the one or more hydraulic pumps.

15. The sweeper machine of claim 14, further comprising first and second steering cables, the first steering cable being connected to the first linkage assembly, the second steering cable being connected to the second linkage assembly.

16. The sweeper machine of claim 15, the first and second steering cables being attached to respective first and second linkage brackets, the first and second linkage brackets being positioned adjacent to the one or more front wheels such that the first and second linkage brackets move upon movement of at least one of the one or more front wheels.

17. The sweeper machine of claim 16, wherein the first and second linkage brackets are slidingly positioned within slots of a horizontal plate, the horizontal plate and at least one of the one or more front wheels sharing a vertical axis about which the horizontal plate and at least one of the one or more front wheels rotate.

18. The sweeper machine of claim 17, wherein the first end of the height adjustment lever comprises a wheel.

19. The sweeper machine of claim 18 further comprising a lateral support arm, the lateral support arm comprising first and second ends, the first end of the lateral support arm being pivotally connected to the collection body, the second end of the lateral support arm being pivotally connected to a sweeper machine frame.

20. The sweeper machine of claim 17, the hydraulic cylinder being structured and arranged to selectively float such that the rotary brush assembly remains in contact with an undulating ground surface.

21. The sweeper machine of claim 19, the lateral support arm comprising an upper portion comprising a slot, the slot being adapted to slide over a height adjustment pin mounted to the collection body.

* * * * *